US010003985B1

(12) United States Patent
Holland et al.

(10) Patent No.: US 10,003,985 B1
(45) Date of Patent: Jun. 19, 2018

(54) SYSTEM AND METHOD FOR DETERMINING RELIABILITY OF NODES IN MOBILE WIRELESS NETWORK

(71) Applicant: HRL Laboratories, LLC, Malibu, CA (US)

(72) Inventors: Gavin D. Holland, Oak Park, CA (US); Michael D. Howard, Westlake Village, CA (US); Tsai-Ching Lu, Thousand Oaks, CA (US); Karim El Defrawy, Santa Monica, CA (US); Matthew S. Keegan, Boston, MA (US); Kang-Yu Ni, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 414 days.

(21) Appl. No.: 14/625,988

(22) Filed: Feb. 19, 2015

Related U.S. Application Data

(63) Continuation-in-part of application No. 14/209,314, filed on Mar. 13, 2014, which is a (Continued)

(51) Int. Cl.
*G06F 11/30* (2006.01)
*G01F 17/00* (2006.01)
(Continued)

(52) U.S. Cl.
CPC .......... *H04W 24/06* (2013.01); *H04L 41/147* (2013.01); *H04L 43/045* (2013.01); *H04L 43/12* (2013.01); *H04W 24/10* (2013.01)

(58) Field of Classification Search
CPC .... H04W 24/06; H04W 24/10; H01L 41/147; H01L 43/12; H01L 43/045
(Continued)

(56) References Cited

U.S. PATENT DOCUMENTS

2006/0114903 A1* 6/2006 Duffy, IV ........... H04L 12/1854
370/390
2011/0280133 A1* 11/2011 Chang .................. H04L 1/0052
370/241
(Continued)

OTHER PUBLICATIONS

O. Kwon and J.-S. Yang. Information Flow between Stock Indices, (2008) EPL 82 68003,
(Continued)

*Primary Examiner* — Dzung Tran
(74) *Attorney, Agent, or Firm* — Tope-McKay & Associates

(57) ABSTRACT

Described is a system for determining reliability of nodes in a mobile wireless network. The system is operable for receiving an Exploitation Network (Xnet) database. The Xnet database has an Xnet structure formed of a physical node layer (NetTopo), a network dependent (NetDep) layer, and an application dependent (AppDep) layer. The NetTopo layer includes NetTopo graphs reflecting connectivity between the nodes. The NetDep layer includes NetDep graphs reflecting connectivity dependencies amongst the nodes, and the AppDep layer includes Appdep graphs reflecting software application dependencies amongst the nodes. An Xnet Analytics Engine is run that monitors and evaluates reliability of each node in the mobile wireless network to provide a reliability estimate of each node.

21 Claims, 9 Drawing Sheets

Related U.S. Application Data continuation-in-part of application No. 13/904,945, filed on May 29, 2013, application No. 14/625,988, which is a continuation-in-part of application No. 13/904,945, filed on May 29, 2013, which is a continuation-in-part of application No. 13/748,223, filed on Jan. 23, 2012.

(60) Provisional application No. 61/941,893, filed on Feb. 19, 2014, provisional application No. 61/784,167, filed on Mar. 14, 2013, provisional application No. 61/589,634, filed on Jan. 23, 2012, provisional application No. 61/589,646, filed on Jan. 23, 2012, provisional application No. 61/694,510, filed on Aug. 29, 2012.

(51) Int. Cl.
*H04W 24/06* (2009.01)
*H04L 12/26* (2006.01)
*H04W 24/10* (2009.01)
*H04L 12/24* (2006.01)

(58) Field of Classification Search
USPC .................................................. 702/183, 56
See application file for complete search history.

(56) References Cited

U.S. PATENT DOCUMENTS

| | | | | |
|---|---|---|---|---|
| 2012/0063595 A1* | 3/2012 | Massoudi | ............ | H04N 7/1675 380/210 |
| 2013/0235757 A1* | 9/2013 | Wang | ...................... | H04L 67/12 370/254 |
| 2014/0143536 A1* | 5/2014 | Holland | ................ | H04W 12/12 713/153 |

OTHER PUBLICATIONS

H. Moon and T. -C. Lu, Early Warning Signal of Complex Systems: Network Spectrum and Critical Trartsdionis, WIN (2010).
H. Moon and T.-C. Lu, Network Catastrophe; Self-Organized Patterns Reveal both the Instability and the Structure of Complex Networks, preprint, (2012).
M. Staniek and K. Lehnertz, Symbolic Transfer Entropy, Physical Review Letters 100, 15801, (2008).
M.Scheffer, J. Bascompte, W.A. Brock, V. Brovkin, S.R. Carpenter, V. Dakos, H. Held, E.H. van Nes, M. Rietkerk, and G. Sugihara, Early-warning signals for critical transitions. Nature, 461, (2009).
T. Schreiber, Measuring Information Transfer, Phys. Rev, Lett. 85, 461, (2000).
CERT US Secret Service and Deloitte. 2010 cybersecurity watch survey. CSO magazine, 2010.
David Allen, Tsai-Ching Lu, and David Huber. Detecting and analyzing relationships among anomalles. In IEEE VAST, 2009.
Michael McCormick, Data theft: a prototypical insider threat. In S. Stolfo et al. (Ed.), Insider Attack and Cyber Security, pp. 53-680. Springer, 2008.
2006 E-Crime Watch Survey CSO Magazine with U.S. Secret Service, CERT Cordination Center, and Microsoft Corp.
Brian Bowen, Malek Ben Salem, Shlomo Hershkop, Angelos Keromytis, Salvatore Stolfo. Designing Host and Network & Sensors to Mitigate the Insider Threat. IEEE Security and Privacy, pp. 22-29, Nov./Dec. 2009.
Robert H. Anderson, Thomas Bozek, Tom Longstaff, Wayne Meitzier, Michael Skrock, and Ken Van Wyk. Research on mitigating the insider three to information systems—#2, RAND Conference Proceedings, 2000.
D. Caputo, M. Maloof, and G. Stephens. Detecting the theft of trade secrets by insidera: a summary of MITRE insider threat research, IEEE Security & Privacy: Fall 2009.
Felicia Duran, Stephen H. Conrad. Gregory N. Conrad, David P. Duggan, and Edward Bruce Held. Building a system for insider security. IEEE Security and Privacy, pp. 30-38, Nov./Dec. 2009.
M. Keeney, E. Kowaiski, D/ Cappelli, A. Moore, T. Shimeall, and S. Rogers, Insider threat study: computer system sabotage in critical infrastructure sectors. Joint SEI and U.S Secret Service Report, 2005.
Adam Barth, Benjamin Rubinsten, Mukund Sundararajan, John Mitchell, Dawn Song, and Peter Bartlett. A learning-based approach to reactive security. In Proc. of the 14th International Conference on Financial Cryptograpny and Data Security, 2010.
Ya'akov Gal and Avi Pfeffer. Networks of influence diagrams: a formalism for reasoning about agents' decision-making processes. Journai of Artificial Intelligence Research 33, pp. 109-147, 2008.
Gerard Wagener, Radu State, Alexandre Dulaunoy, and Thomas Engel. Self adaptive high interaction honeypots driven by game theory. In SSS '09: Proceedings of the 11th International Symposium on Stabilzation, Safety, and Security of Distributed Systems, pp. 741-755, Berlin, Heidelberg, 2009. Springer-Verlag.
Changhe Yuan, Xiaolu Liu, Tsai-Ching Lu, and Heejin Lim. Most relevant explanation: Properites, algorithms, and evaluations, In Proceeding of the 25th Conference on Uncertainty in Artificial Intelligence (UAI 2009), 2009.
Aaron Clauset, Cristopher Moore, and M. E. J. Newman. Hierarchical structure and the prediction of missing links in networks. Nature, 453 (7191): 98-101, 2008.
B. Davison and H. Hirsh. Predicting Sequences of User Actions. AAAI-98 Workshop, 1998.
Steven McKinney, Insider threat: user identification via process profiling. Ph.D. thesis, NCSU, 2008.
N. Nguyen, P. Relher, and G.H Kuenning, Detecting insider threats by monitoring system call activity. IEEE Information Assurance Workshop, United States Military Academy West Point, New York, 2003.
Malek Ben Salem, Shlomo Hershkop, and Salvatore Stolof, A Survey of Insider Attack Detection Research. In S. Stolfo et al. (Ed), Insider Attack and Cyber Security. pp. 69-90. Springer, 2008.
Mikhail Belkin and Partha Niyogi. Laplacian Eigenmaps for dimensionality reduction and data representation. In Neural Computation, vol. 15, 2003.
N. Marwan, M.C. Romano, M. Thiel, and J. Kurths. Recurrence plots for the analysis of complex systems. In Physics Reports, 436, 237-329.
Malek Ben Salem and Salvatore Stolfo. Detecting Masqueraders: A Comparison of One-Class Bag-of-Words User Behavior Modeling Techniques. In Proceedings of the Second International Workshop on Managing Insider Security Threats, 2010.
M. Scheffer, J. Bascompte, W.A. Brook, V. Brovkin, S.R. Carpenter, V. Dakos, H. Held, E.H. van Nes, M. Rietkerk, and G. Sugihara. Early-warning signals for critical transitions. Nature, 461, 53-59, 2009.
O. Kwon and J.-S. Yang. Information Flow between Stock Indices, 2008 EPL 82 68003.
M. Staniek and K. Lehnertz, Symbolic Transfer Entropy, Physical Review Letters 100, 15801, 2008.
M. Scheffer, J. Bascompte, W.A. Brock, V. Brovkin, S.R. Carpenter, V. Dakos, H. Held, E.H. van Nes, M. Rietkerk, and G. Sugihara, Early-warning signals for critical transitions, Nature, 461, 2009.
T. Schreiber, Measuring Information Transfer, Phys. Rev. Lett. 85, 461, 2000.
K.-Y. Ni and T.-C. Lu, Detection and Identification of Directional Infuences using information Dynamic Spectrum, Proceedings of the 4th Workshop on Information in Networks, 2012.
D. Cappelli, R. Trzeciak, and R. Floodeen. "The Key to Successful Monitoring for Dectection of Insider Attacks," presented at RSA Conference 2010, Mar. 2010.
2010 CyberSecuity Watch Survey, www.cert.org/archieve/pdf/ecrimesummary10.pdf.
T. Kolda and B. Bader. "Tensor Decompositions and Applications," in SIAM Review, Jun. 2008.

(56) References Cited

OTHER PUBLICATIONS

J. Sun, D. Tao, S. Papadimitriou, P. Yu, and C. Faloutsos, "Incremental Tensor Analysis: Theory and Applications" in ACM Transactions on Knowledge Discovery from Data, vol. 2, No. 3, Oct. 2008.
National Research Council. "Network Science," The National Academies Press, 2005.
Charles Pfleeger, Reflections on the Insider Threat. In S. Stolfo et al. (Ed.), Insider Attack and Cyber Security, pp. 5-15, Springer, 2008.
Malek Ben Salem, Shlomo Hershkop, and Salvatore Stolof. A Survey of Insider Attack Detection Research. In S. Stolfo et al. (Ed.), Insider Attack and Cyber Security, pp. 69-90. Springer, 2008.
Michael McCormick. Data theft a prototypical inder threat. In S. Stolfo et al. (Ed.), Insider Attack and Cyber Security, pp. 53-68. Springer, 2008.
M. Scheffer, J. Bascompte, W.A. Brock, V. Brovkin, S.R. Carpenter, V. Dakos, H. Held, E.H. van Nes, M. Rietkerk & G. Sugihara, Early-warning signals for critical transitions. Nature, 461: 53-59, 2009.
V. Dakos, E. H. van Nes, R. Donangelo, H. Fort, and M. Scheffer (in press). Spatial correlation as leading indicator of catastrophic shifts. Theoretical Ecology, 2009.
J. A. Almendral and A. Diaz-Guilera, Dynamical and spectral properties of complex networks, New J. Phys. 9 187. 2007.
V. Guttal and C. Jayaprakash. Spatial variance and spatial skewness: leading indicators of regime shifts in spatial ecological systems, Theoretical Ecology, 2009.
P. N. McGraw and M. Menzinger, Analysis of nonlinear synchronization dynamics of oscillator networks by Laplacian spectral methods, Physical Review E 75, 2007.
L.M. Pecora and T.L. Carroll, Master Stability Functions for Synchronized Coupled Systems, Phys. Rev. Lett. 1998.
D. Harmon, M De Aguitar, D. Chinellafo, D. Braha, R.R. Epstein, and Y. Bar-Yam, Predicting economic market crises using measures of collective panic, Arxiv.org, 2011.
Hankyu Moon and Tsai-Ching Lu. Early warning signal of complex systems: Network spectrum and critical transitions. In Workshop on Information in Networks (WIN), 2010.
H. Moon and T.-C. Lu, Network Catastrophe: Self-Organized Patterns Reveal both the instability and the Stucture of Complex Networks. preprint, 2012.
G. Holland and N. Vaidya, "Analysis of TCP performance over mobile ad hoc networks," in Proceedings of the 5th annual ACM/IEEE international conference on Mobile computing and networking, ser. MobiCom '99. New York, NY, USA: ACM, 1999, pp. 219-230. [Online]. http://doi.acm.org/10.1145/313451.313540.
Y.-Y. Liu, et al., "Controllability of complex networks," Nature, vol. 473, pp. 167-173, 2011.
Yang-Yu Liua, Jean-Jacques Slotinef, and Albert-László Barabàsia, "The observability of complex systems," PNAS, vol. 110, No. 7, pp. 2460-2465. 2013.
K.-Y. Ni and T.-C. Lu, "Information dynamic spectrum predict critical transitions," in Proceedings of 2nd International Conference on Complex Sciences: Theory and Applications (COMPLEX 2012), Santa Fe, New Mexico, Dec. 2012, pp. 267-280.
A. Josang. "An algebra for assessing trust in certification chains." in J. Kochmar, editor, Proceedings of the network and Distributed Systems Security Symposium (NDSS '99), The Internet Society, 1999.
C. Nicolaides, L. Cueto-Felgueroso, M. C. Gonzàlez, and R. Juanes, "A metric of influential spreading during contagion dynamics through the air transportation network," PLOS one, vol. 7, No. 7, e40961, 2012.
J.-P. Hubaux, L. Buttyàn, and S. Capkun, "The quest for security in mobile ad hoc networks," in Proceedings of the 2nd ACM international symposium on Mobile ad hoc networking & computing. ACM, 2001, pp. 146-155.
S. Marti, T. J. Giuli, K. Lai, M. Baker et al., "Mitigating routing misbehavior in mobile ad hoc networks," in International Conference on Mobile Computing and Networking: Proceedings of the 6 th annual international conference on Mobile computing and networking, vol. 6, No. 11, 2000, pp. 255-265.
H. Yang, J. Shu, X. Meng, and S. Lu, "Scan: self-organized network-layer security in mobile ad hoc networks," Selected Areas in Communications, IEEE Journal on, vol. 24, No. 2, pp. 261-273, 2006.
Y. Zhang, et al., "Security in mobile ad-hoc networks" in Ad Hoc Networks, Springer, 2005, pp. 249-268.
K. Govindan and P. Mohapatra, "Trust computations and trust dynamics in mobile adhoc networks: a survey," Communications Surveys & Tutorials. IEEE. vol. 14, No. 2, pp. 279-298, 2012.
A. Jøsang, R. Ismail, and C. Boyd, "A survey of trust and reputation systems for online service provision," Decision support systems, vol. 43, No. 2, pp. 618-644, 2007.
P. Michiardi, et al., "Core: a collaborative reputation mechanism to enforce node cooperation in mobile ad hoc networks," in Proceedings of the IFIP TC6/TC11 Sixth Joint Working Conference on Communications and Multimedia Security: Advanced Communications and Multimedia Security, 2002, pp. 107-121.
S. Noel, et al., "Advances in topological vulnerability analysis," in Conference for Homeland Security, 2009. CATCH'99. Cybersecurity Applications & Technology, IEEE. 2009. pp. 124-129.
T. Karagiannis, K. Papagiannaki, and M. Faloutsos, "Blinc: multi-level traffic classification in the dark." in ACM SIGCOMM Computer Communications Review. vol. 35, No. 4, ACM, 2005, pp. 229-240.
S. Noel and S. Jajodia, "Understanding complex attack graphs through clustered adjacency matrices," in Computer Security Applications Conference, 21st Annual. IEEE, 2005, pp. 1-10.
M. Kurant, et al., "Layered complex networks," Physical review letters, vol. 96, No. 13, pp. 138701.1-138701.4, 2006.
S. V. Buldyrev, R. Parshani, G. P. H. E. Stanley, and S. Havlin, "Catastrophic cascade of failures in interdependent networks." Nature, vol. 464, No. 7291, pp. 1025-1028, 2010.
Extendable Mobile Ad-hoc Network Emulator (EMANE). Naval Research Laboratory, Networks and Comm. Systems Branch. [Online] http://cs.itd.nrl.navy.mil/work/emane/, taken on Jan. 26, 2015.
J. Gao, et al., "Networks formed from interdependent networks." Nature Physics, vol. 8, No. 1, pp. 40-48, 2011.
K.E. Defrawy and G. Tsudik, "Anonymous location aided routing in suspicious MANETs," IEEE Transactions on Mobile Computing (IEEE TMC), vol. 10, No. 9, pp. 1345-1358. Sep. 2011.
Y. Kong, "Resilience to degree-dependent and cascading node failures in random geometric networks," IEEE Transactions on Information Theory, vol. 56, No. 11, pp. 5533-5546, 2010.
NS-3 discrete-event network simulator. [Online] http://www.nsnam.org/. taken Feb. 2015.
N. C. Valler, B. A. Prakash, H. Tong, M. Faloutsos, and C. Faloutsos, "Epidemic spread in mobile ad hoc networks: determing the tipping point," in Proceedings of the 10th international IFIP TC 6 conference on Networking—Volume Part I, ser. NETWORKING'11. Berlin, Heidelberg: Springer-Verlag, 2011, pp. 266-280. [Online] http://dl.acm.org/citation.cfm?id=2008780.2008807.

\* cited by examiner

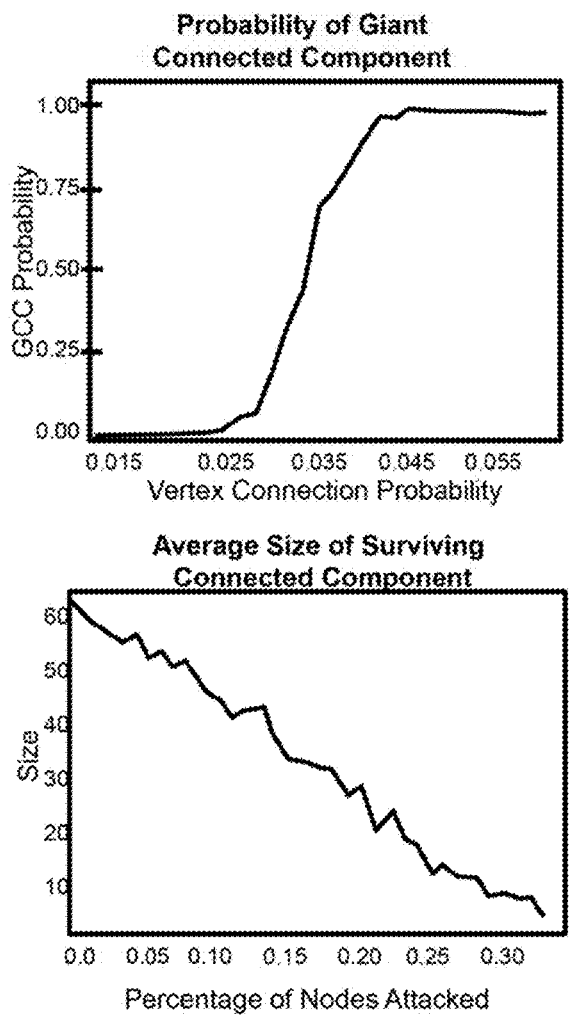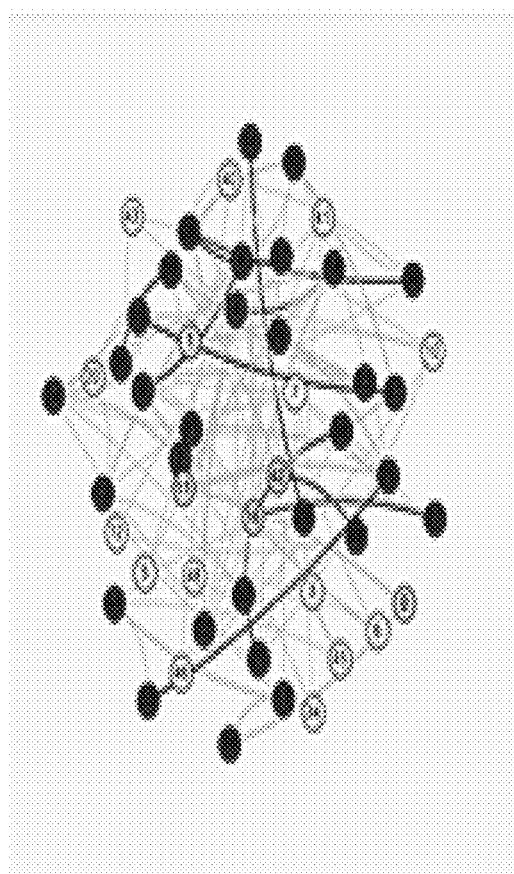
FIG. 7A                    FIG. 7B

SYSTEM AND METHOD FOR DETERMINING RELIABILITY OF NODES IN MOBILE WIRELESS NETWORK

CROSS-REFERENCE TO RELATED APPLICATIONS

This is a non-provisional patent application of U.S. Provisional Application No. 61/941,893, filed on Feb. 19, 2014, entitled, "System and method to quantify reliability of nodes in mobile wireless networks."

This is ALSO a Continuation-in-Part application of U.S. application Ser. No. 14/209,314, filed on Mar. 13, 2014, which is a Continuation-in-Part of U.S. application Ser. No. 13/904,945, filed on May 29, 2013. U.S. application Ser. No. 14/209,314 ALSO claims priority from U.S. Provisional Application No. 61/784,167, filed on Mar. 14, 2013.

This is ALSO a Continuation-in-Part application of U.S. application Ser. No. 13/904,945, filed on May 29, 2013, which is a Continuation-in-Part of U.S. application Ser. No. 13/748,223, filed on Jan. 23, 2013 which is a Non-provisional application of U.S. Provisional Application No. 61/589,634, filed on Jan. 23, 2012, and U.S. Provisional Application No. 61/589,646, filed on Jan. 23, 2012. U.S. application Ser. No. 13/904,945 ALSO claims priority of U.S. Provisional Application No. 61/694,510, filed on Aug. 29, 2012,

GOVERNMENT RIGHTS

This invention was made with government support under U.S. Government Contract Number FA8750-14-C-0017 awarded by DARPA. The government has certain rights in the invention.

FIELD OF INVENTION

The present invention relates to a mobile wireless network and, more particularly, to a system for determining the reliability of nodes in the mobile wireless network.

BACKGROUND OF INVENTION

Security in wireless networks is increasingly important. Wireless networks are formed of several nodes, each of which can be prone to attack or can be operated in a malicious manner. Thus, it is desirable to identify misbehaving nodes. Current research in the detection of misbehaving nodes in mobile wireless networks is still predominantly focused on adapting and optimizing conventional network defense strategies that concentrate on behaviors at the lower layers of the networking stack (see the List of Incorporated Literature References, Literature Reference Nos. 7 through 13). Research on strategies such as signature detection, statistical anomaly detection, and specification-based detection have proven effective for specific attack and network scenarios, but applicability to more general scenarios has proven to be elusive. What has been missing is a higher-level behavioral analysis of the entire networking stack and applications, on each node and on the network as a whole. It is this perspective that recent research in network science and information dynamics can now provide through the formulation and analysis of the graph-theoretic network-of-networks (NoN) model (see Literature Reference Nos. 14 through 16). Although NoN has been widely applied to the study of the dynamics of social networks, its application to cyber-security has only recently been recognized following breakthroughs of methods for modeling both logical and physical networks in NoN (see Literature Reference No. 17), where connectivity and dynamics are fundamentally different.

Thus, a continuing need exists for a system that extends the NoN model to the challenging environment of mobile wireless networks, particularly under real-world assumptions of scale and complexity.

SUMMARY OF INVENTION

Described is a system for determining reliability of nodes in a mobile wireless network. The system includes one or more processors and a memory, the memory being a non-transitory computer-readable medium having executable instructions encoded thereon, such that upon execution of the instructions, the one or more processors perform several operations as described herein. The system is operable for receiving an Exploitation Network (Xnet) database. The Xnet database has an Xnet structure formed of a physical node layer (NetTopo), a network dependent (NetDep) layer, and an application dependent (AppDep) layer. The NetTopo layer includes NetTopo graphs reflecting connectivity between the nodes. The NetDep layer includes NetDep graphs reflecting connectivity dependencies amongst the nodes, and the AppDep layer includes Appdep graphs reflecting software application dependencies amongst the nodes. An Xnet Analytics Engine is run that monitors and evaluates reliability of each node in the mobile wireless network to provide a reliability estimate of each node.

In another aspect, the Xnet Analytics Engine further comprises: an Xnet Dynamics (XD) module that is operable for detecting and predicting critical transitions in the AppDep and NetDep layers for misinformation identification; an Xnet Controllability and Observability (XCO) module that is operable for identifying nodes in the Xnet for active probing and observation as suspect nodes; an Xnet Evolvability (XE) module that is operable for predicting potential propagation and consequences of an attack on one or more nodes and focusing resources for monitoring and protecting the network; and a Reliability Estimation (RE) module that is operable for receiving data from each of the XD module, XCO module, and XE module to generate a reliability estimation of each node in the mobile wireless network, the reliability estimation being a trust metric. If a node's trust metric falls below a predetermined threshold, the system causes the XCO module to actively probe and observe the node to test the reliability estimate.

In another aspect, the XD module receives a data plane of behavior time series as extracted from the AppDep and NetDep layers to generate structure dependency changes in the AppDep and NetDep layers, the structure dependency changes being indicative of critical transitions in the AppDep and NetDep layers between misbehaving nodes for misinformation identification.

In another aspect, the XCO module receives the AppDep graphs, NetDep graphs, NetTopo graphs, and structure dependency changes as generated by the XD module to identify the nodes in the Xnet for active probing and observation as suspect nodes.

In yet another aspect, the XE module receives the Xnet structure, the misbehaving nodes, and suspect nodes to generate a confidence measure of how well an observed pattern of node failures matches a contagion or cascade failure, such that if the confidence measure exceeds a predetermined threshold, the XE module outputs simulation results of anticipated contagion paths with a set of anticipated critical nodes whose failures can trigger collapse of the Xnet structure.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 7A is an illustration depicting the probability that a large connected component remains in the network, and its corresponding size;

FIG. 7B is an illustration depicting the simulations of contagion and the likelihood of infection of individual nodes that leads to epidemics;

DETAILED DESCRIPTION

Figure 1:
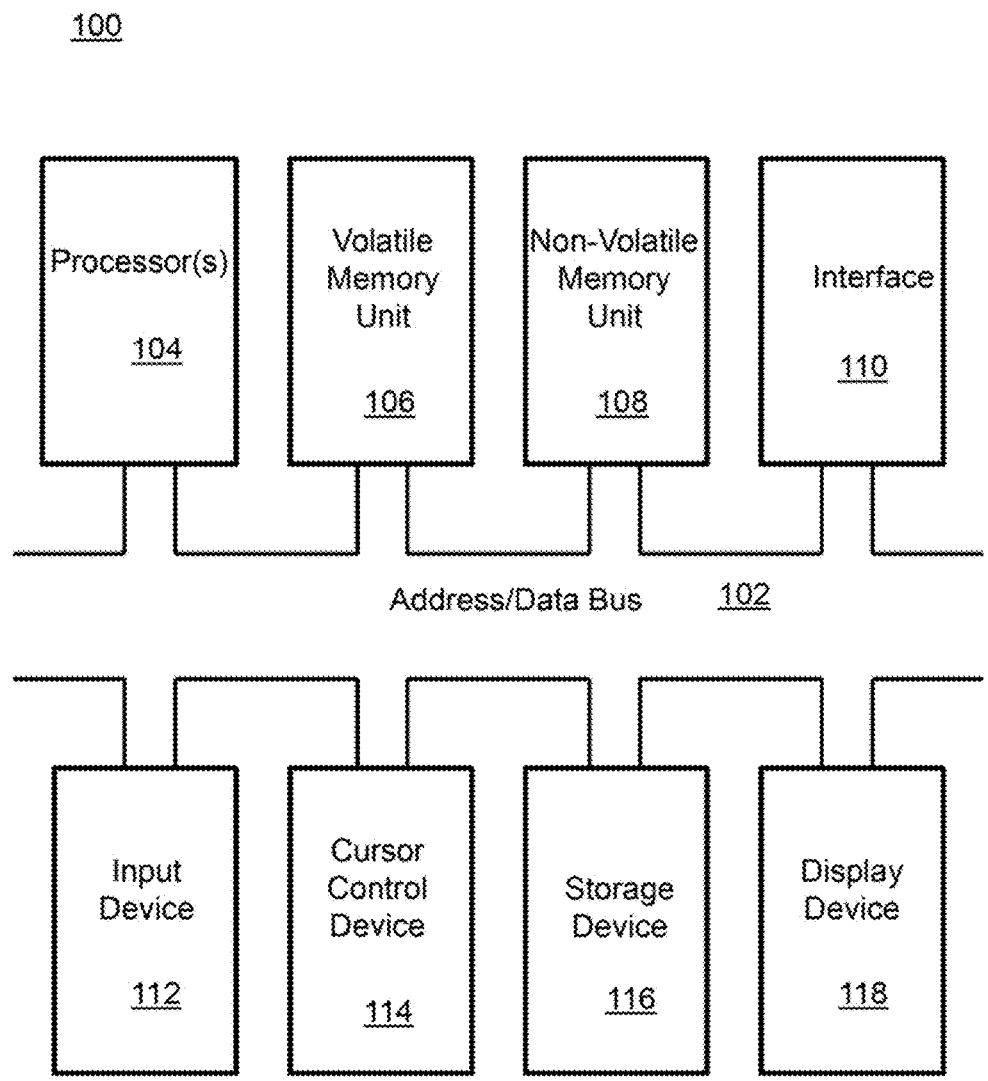
FIG. 1 is a block diagram depicting the components of a system according to the principles of the present invention.

The present invention relates to a mobile wireless network and, more particularly, to a system for determining the reliability of nodes in the mobile wireless network. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of incorporated literature references is provided. Next, a description of the various principal aspects of the present invention is provided. Subsequently, an introduction provides the reader with a general understanding of the present invention. Finally, specific details of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number.

1. G. Holland and N. Vaidya, "Analysis of TCP performance over mobile ad hoc networks," in *Proceedings of the 5th annual ACM/EEE international conference on Mobile computing and networking*, ser. MobiCom '99. New York, N.Y. USA: ACM, 1999, pp. 219-230.
2. Y.-Y. Liu, J.-J. Slotine, and A.-L. Barabasi, "Controllability of complex networks," *Nature*, vol. 473, pp. 167-173, 2011.
3. "The observability of complex systems," *PNAS*, vol. 110, no. 7, pp. 2460-2465, 2013.
4. K.-Y. Ni and T.-C. Lu, "Information dynamic spectrum predict critical transitions," in *Proceedings of 2nd International Conference on Complex Sciences: Theory and Applications (COMPLEX 2012)*, Santa Fe, New Mexico, December 2012.
5. A. Jøsang, "An algebra for assessing trust in certification chains," in Proceedings of the Network and Distributed Systems Security Symposium (NDSS'99). The Internet Society, 1999.
6. C. Nicolaides, L. Cueto-Felgueroso, M. C. González, and R. Juanes, "A metric of influential spreading during contagion dynamics through the air transportation network," *PLOS one*, vol. 7, no. 7, 2012.
7. J.-P. Hubaux, L. Buttyán, and S. Capkun, "The quest for security in mobile ad hoc networks," in *Proceedings of the 2nd ACM international symposium on Mobile ad hoc networking & computing*. ACM, 2001, pp. 146-155.
8. S. Marti, T. J. Giuli, K. Lai, M. Baker et al., "Mitigating routing misbehavior in mobile ad hoc networks," in International Conference on Mobile Computing and Networking: Proceedings of the 6th annual international conference on Mobile computing and networking, vol. 6, no. 11, 2000, pp. 255-265.
9. H. Yang, J. Shu, X. Meng, and S. Lu, "Scan: self-organized network-layer security in mobile ad hoc networks," *Selected Areas in Communications, IEEE Journal on*, vol. 24, no. 2, pp. 261-273, 2006.
10. Y. Zhang and W. Lee, "Security in mobile ad-hoc networks," in *Ad Hoc Networks*. Springer, 2005, pp. 249-268.
11. K. Govindan and P. Mohapatra, "Trust computations and trust dynamics in mobile adhoc networks: a survey," *Communications Surveys & Tutorials, IEEE*, vol. 14, no. 2, pp. 279-298, 2012.
12. A. Jøsang, R. Ismail, and C. Boyd, "A survey of trust and reputation systems for online service provision," *Decision support systems*, vol. 43, no. 2, pp. 618-644, 2007.
13. P. Michiardi and R. Molva, "Core: a collaborative reputation mechanism to enforce node cooperation in mobile ad hoc networks," in *Proceedings of the IFIP TC6/TC11 Sixth Joint Working Conference on Communications and Multimedia Security: Advanced Communications and Multimedia Security,* 2002, pp. 107-121.
14. S. Noel, M. Elder, S. Jajodia, P. Kalapa, S. O'Hare, and K. Prole, "Advances in topological vulnerability analysis," in *Conference For Homeland Security,* 2009. *CATCH'09. Cybersecurity Applications & Technology*. IEEE, 2009, pp. 124-129.
15. T. Karagiannis, K. Papagiannaki, and M. Faloutsos, "Blinc: multilevel traffic classification in the dark," in *ACM SIGCOMM Computer Communication Review*, vol. 35, no. 4. ACM, 2005, pp. 229-240.
16. S. Noel and S. Jajodia, "Understanding complex network attack graphs through clustered adjacency matrices," in *Computer Security Applications Conference, 21st Annual*. IEEE. 2005, pp. 10-pp.
17. M. Kurant and P. Thiran, "Layered complex networks," *Physical review letters*, vol. 96, no. 13, p. 138701, 2006.
18. S. V. Buldyrev, R. Parshani, G. P. H. E. Stanley, and S. Havlin, "Catastrophic cascade of failures in interdependent networks," *Nature,* vol. 464, no. 7291, 2010.
19. Extendable Mobile Ad-hoc Network Emulator (EMANE). Naval Research Laboratory, Networks and Communications Systems Branch. [Online]. Available: http://cs.itd.nrl.navy.mil/work/emane/, taken on Jan. 26, 2015
20. J. Gao, S. V. Buldyrev, H. E. Stanley, and S. Havlin, "Networks formed from interdependent networks," *Nature Physics*, vol. 8, no. 1, 2011.
21. K. E. Defrawy and G. Tsudik, "Anonymous location aided routing in suspicious MANETs," *IEEE Transactions on Mobile Computing (IEEE TMC)*, vol. 10, no. 9, September 2011.
22. Y. Kong, "Resilience to degree-dependent and cascading node failures in random geometric networks," *IEEE Transactions on Information Theory*, vol. 56, no. 11, pp. 5533-5546, 2010.
23. ns-3 discrete-event network simulator. [Online]. Available: http://www.nsnam.org/, taken on Jan. 26, 2015
24. N. C. Valler, B. A. Prakash, H. Tong, M. Faloutsos, and C. Faloutsos, "Epidemic spread in mobile ad hoc networks: determining the tipping point," in *Proceedings of the 10th international IFIP TC 6 conference on Networking—Volume Part I,* ser. NETWORKING'11. Berlin, Heidelberg: Springer-Verlag, 2011, pp. 266-280. [Online]. Available: http://dl.acm.org/citation.cfm?id=2008780.2008807.
25. A. Jøsang, "An algebra for assessing trust in certification chains," in J. Kochmar, editor, Proceedings of the Network and Distributed Systems Security Symposium (NDSS'99), The Internet Society, 1999.

(2) Principal Aspects

The present invention has three "principal" aspects. The first is system for determining the reliability of nodes in a mobile wireless network. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that are organized as modules and that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
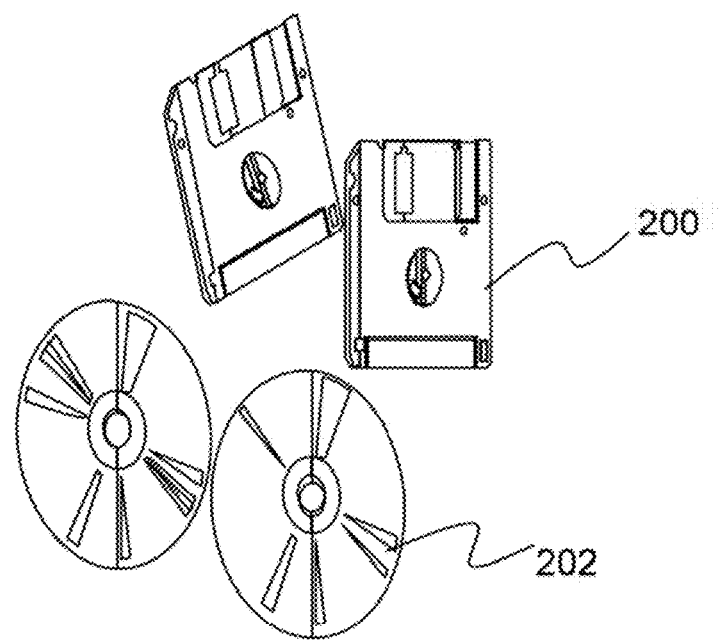
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

The system described herein quantifies the reliability of nodes in mobile wireless networks. By converting the details of the network stack and the physical layer into a mathematical representation of the relationships between network elements and services called the eXploitation net-work (Xnet), it is possible to apply these techniques for wireless networks. The techniques as applied to social networks and network science can identify dynamic structure dependency changes in Xnet that can signal suspicious nodes, and then determine a minimal set of nodes that can confirm a diagnosis using network observability and controllability theory. The approach goes beyond event detection, identifying future threats requiring heightened vigilance by using cascading and contagion algorithms to predict how sources of misinformation will spread in the network.

The system can be implemented in a wide variety of mobile wireless networks, non-limiting examples of which include mobile military and law enforcement networks (e.g., soldier-to-soldier, sensor-to-sensor, ground and aerial vehicle-to-vehicle); commercial vehicle-to-vehicle and vehicle-to-infrastructure networks (e.g., DSRC V2V/V2I, WiFi, active safety, infotainment); commercial mesh networks (metropolitan rooftop. WiMAX); and wireless infrastructure ISPs, cellular companies (e.g., extended data capacity). The system will significantly improve the security of these and other related networks, which currently rely predominantly on packet-level encryption to reduce the probability of external intrusion but do not detect or prevent "network insider" attacks.

Implementation of the system will take the form of a set of algorithms/modules that provide rapid and accurate detection and prediction of sources of misinformation in the control plane of a wireless network. The algorithms/modules are protocol agnostic characteristics of the tool that enable its transition into a wide variety of network security systems, including both wireless and wired networks. Further-more, the inherent scalability of the approach makes it well-suited to operate effortlessly in much larger networks.

The system includes at least four unique modules, including: (1) the Xnet Dynamics (XD) module, (2) the Xnet Controllability/Observability (XCO) module, (3) the Xnet Evolvability (XE) module, and (4) the Reliability Estimation (RE) module. The XD module identifies unreliable nodes based on the dynamics of social networks (with no dependency on protocol) to indicate the presence of malicious or damaged nodes altering control and data plane information in the network. The XCO module identifies the optimal set of nodes required to passively monitor (observability) or actively probe (controllability) a suspected source of misinformation. These techniques require significantly fewer nodes (i.e., lower overhead than the prior art) to form a consensus on whether a suspected source of misinformation is malicious without compromising accuracy (increased probability of detection, lowered probability of false alarms). The XE module simulates a progression of failures to predict which nodes are most likely to be attacked next or should have trust reassessed. Finally, the RE module fuses cross-layer and cross-plane (control and data plane) information to identify suspicious nodes and improve reputation-based trust management. The unified trust metric is computed in a hybrid approach in which nodes combine normalized confidence and trust values based on direct experience and recommendations of other nodes. Such a hybrid approach avoids a centralized point of failure, ensures scalability, and renders the computation resilient to attacks targeting such computations. These modules are described in further detail below.

(4) Specific Details of the Invention

As noted above, described is a system for determining the reliability of nodes in a mobile wireless network. To provide for such functionality, it is helpful to represent such a wireless network in a behavioral manner. To this end, the system employs an Exploitation Network (Xnet) which is a hierarchical model of the network (a network of networks) that provides three different views of the network. The different views are linked together by directional links: an application dependency layer (AppDep) and a network dependency layer (NetDep) in addition to the network topology (NetTopo) itself. Xnet moves the problem out of the realm of conventional wireless networking techniques focused on throughput between pairs of nodes, into a representation that enables a more holistic behavioral treatment. This is the foundation that enables the social networking and information dynamics approach as implemented in the various modules described herein.

Figure 3:
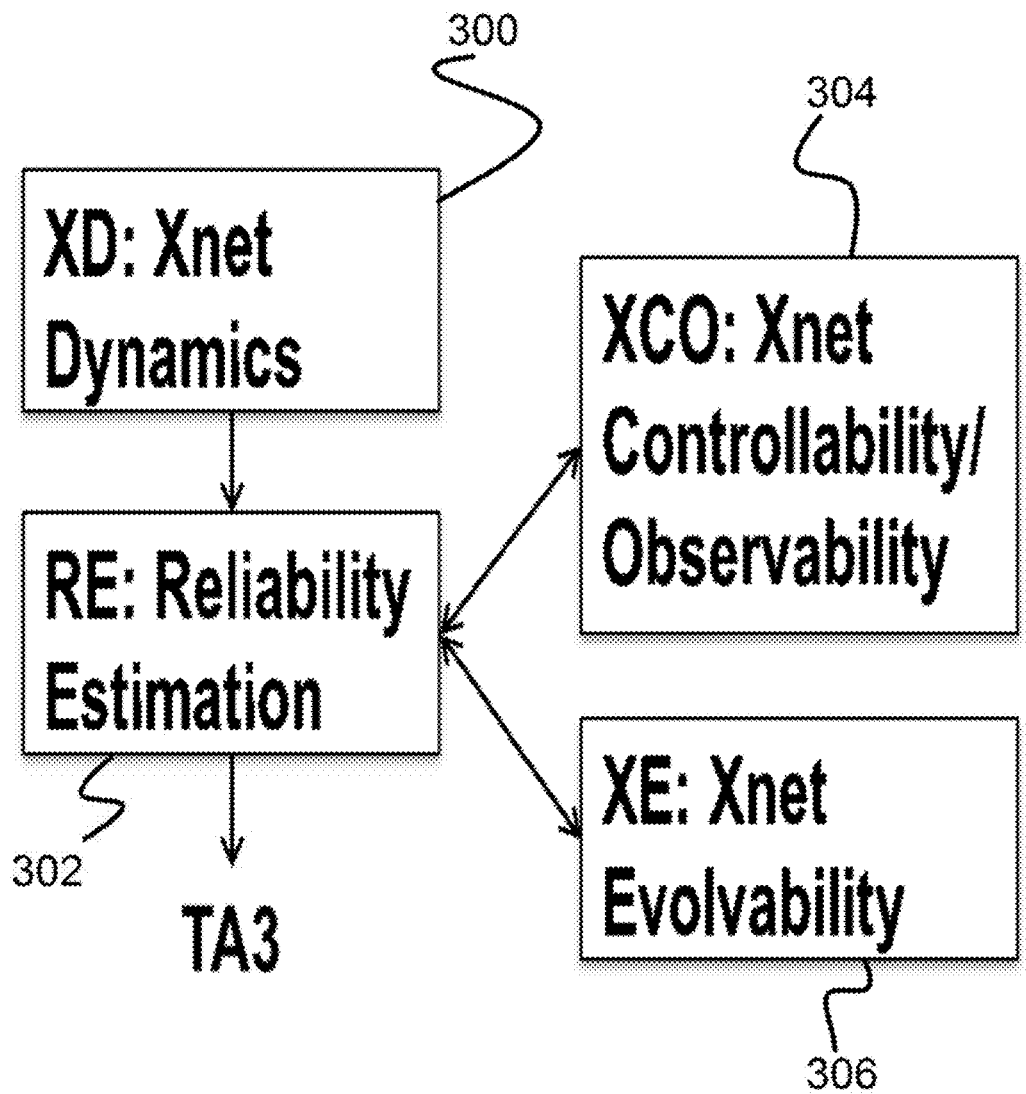
FIG. 3 is an illustration depicting a relationship between modules according to the principles of the present invention.

For further understanding, FIG. 3 illustrates the relationship between the modules. All modules communicate by annotations on Xnet. The XD module 300 identifies nodes that appear to be misbehaving. The RE module 302 gets a minimal set of driver and observer nodes from the XCO module 304 for the suspect nodes. The RE module 300 uses the driver nodes to do active probing on the suspect nodes, and the observer nodes update a trust metric with the results. The XE module 306 simulates a spread of compromised nodes The RE module 302 formalizes and quantities trust using a model that relies on local computations based on direct interactions with neighbors and also by incorporating recommendations (and experiences) of other nodes. A formal subjective logic and trust model is leveraged for principled combination of evidence about how trustworthy a node is. Resilience to attacks is gained by adopting a hybrid distributed approach to compute trust, avoiding a single point of failure, and the approach is agnostic to control and/or data plane statistics being used. When the RE module 302 trust in a node falls below a certain level, it performs active probing on the node. To do that most efficiently the XCO module 304 computes a minimal set of driver nodes to issue the challenges and observer nodes to observe the results.

The system also employs a two-pronged approach to discover sources of misinformation in the network, employing information dynamics identification of suspicious changes in Xnet dependencies, as well as trends in the appearance of such compromised nodes. First the XD module 300 uses a novel information dynamic spectrum framework to predict system instability at critical transitions in complex systems, by analyzing Xnet time series data. This marks nodes for further inspection by the RE module 302. Second, the XE module 306 tracks trends in misbehaving nodes, and matches against simulations of contagion and cascading failures. The XE module 306 will emit a confidence measure as to whether there is a pattern, and if so, the RE module 302 can focus monitoring and testing resources on predicted next nodes to be attacked. System Administrators can use this information to focus preventative measures.

Figure 4:
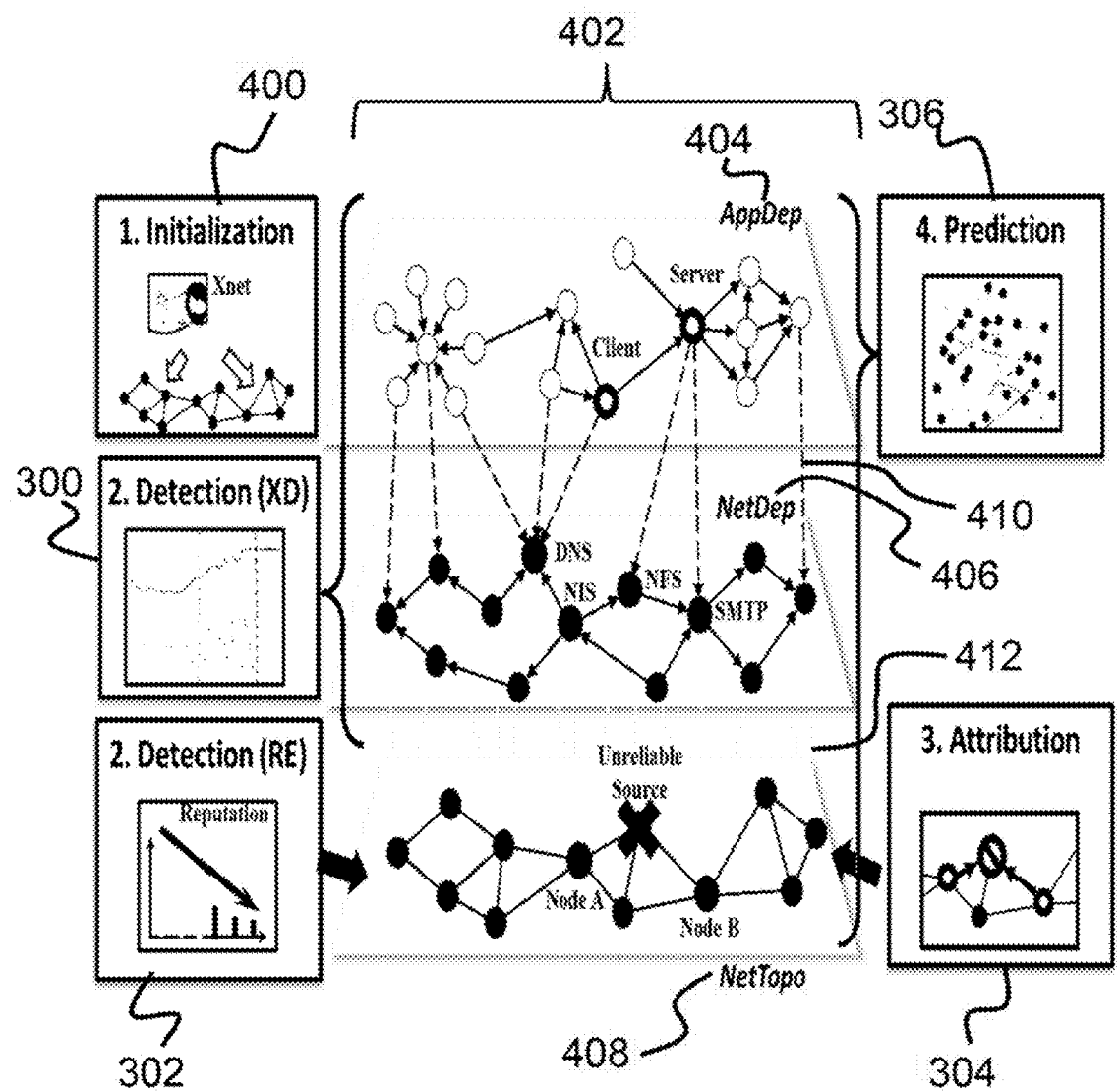
FIG. 4 is an illustration depicting an Exploitation Network (Xnet) and its layers as applicable to the modules.

An example of the approach is illustrated in FIG. 4. Specifically, FIG. 4 illustrates the approach with an example of a notional mission that progresses in distinct stages: from initialization to deployment, fielded operation, and attack.

During operation, a baseline Exploitation Network (Xnet) database is loaded into the network at initialization 400. The application (AppDep) and network (NetDep) dependency graphs, and their interdependencies (dashed lines), are established a priori using expert domain knowledge or by automated inference using tools such as NSDMiner. NSDMiner is an open source tool developed to solve the problem of identifying Network Service Dependencies in distributed systems. Their interdependencies with the network topology (NetTopo) are based on the software configuration in the network. The operation and various modules are described in further detail below.

(4.1.1) Initialization Stage

During initialization, network administrators configure each node with compatible networking stacks, host and network services, applications, and other software necessary for the mission; including the suite of modules with supporting configuration data. Then Xnet, the hierarchical representation of the network, is created in the form of tables that describe the applications and services that are running on the network, their inter-dependencies, and observable characteristics of their behavioral dynamics under normal operation (e.g. node degree, traffic flow characteristics, topology). The XD module 300 receives the Application Dependency (AppDep) and Network Dependency (NetDep) graph from Xnet, and the RE module 302 receives baseline versions of trust and reputation tables.

(4.1.2) Nominal Operation

During nominal operation, the XD module 300 monitors the dynamics of Xnet and the RE module 302 maintains and monitors the reputation-based unified reliability metric. Specifically, the XD module 300 monitors the dynamics of the AppDep and NetDep graphs by collecting time-series data on statistics identified in its baseline configuration. The RE module 302 on each node maintains a local trust table through direct observation of the behavior of neighboring nodes, and a reputation table by exchanging trust tables with other nodes across the network. It also periodically updates Xnet to reflect changes in routing.

A detection of suspicious activity is flagged if the XD module 300 detects a step-change in Xnet dynamics or if the RE module 302 detects that a node has garnered a bad reputation. In the example here, an unreliable source has caused a disruption that impacts a network file system (NFS) server that causes an email server to stall. Thereafter, the RE module 302 uses the XCO module 304 to compute the ideal set of driver and sensor nodes to probe the set of suspicious nodes for attribution. The driver nodes issues challenges to the suspicious nodes and the sensors nodes assist in observing their behavior. Attribution is confirmed if a bad reputation is achieved. If the attribution is successful, the XE module 304 initiates predictive simulations to detect patterns of contagion or cascading failures.

(4.1.3) Attack Stage—Detection Phase

During an attack stage, a compromised node will attract the attention of two modules. The XD module 300 will observe a sudden change in the dynamics in Xnet that can indicate misbehavior. For example, malicious dropping of packets at a node will result in a step-change in the load between applications and services that depend on that node. The RE module 302 will observe a drop in the attacking node's reputation score due to a change in observed network statistics or violations in protocols. For example, the attacking node's dropping of packets can be observed directly at the MAC by monitoring the channel and observing whether the node is forwarding packets to the next hop.

(4.1.4) Attack Stage—Attribution Phase

To reduce the probability of a false alarm, the RE module 302 may enter a phase of active probing for definitive attribution. It starts by annotating Xnet with information such as the suspect (target) nodes, and trust and reputation scores. It then calls the XCO module 304 with the updated Xnet. The XCO module 304 computes a minimal set of nodes ("driver nodes") that have influence over the target nodes, as well as the ideal set of nodes ("sensor nodes") for observing the target nodes' behavior. The XCO module 304 on the driver nodes issue challenges to the targets, and their behavior is observed with the aid of the sensor nodes. The outcomes of the challenges result in adjustments to the trust and reputation scores of the targets. Attribution is affirmed if their reputation stays below a predefined threshold. If affirmed, Xnet is updated and an alert is issued to the system administrators.

(4.1.5) Attack Stage—Prediction Phase

If the RE module 302 issues an alert, it also calls the XE module 304 with the updated Xnet. The XE module 304 simulates possible contagion and cascading failure scenarios from the time series of detections. If the XE module 304 detects a pattern of contagion or cascading failure, then it informs the RE module 302 which uses this information to optimize detection by concentrating effort on nodes that have been predicted as being candidates for future infection or failure. This information can be used for preventative measures.

(4.2) Exploitation Network (Xnet)

As noted above and as shown in FIG. 4, the system implements an Exploitation Network (Xnet) 402, which captures the interdependency among network topology, dynamics, and applications in mobile wireless networks. This representation allows the system to go beyond conventional techniques to develop a more robust and efficient reliability estimation by applying the latest in network sciences and information dynamics. Xnet is built upon the theory of network of networks (see Literature Reference Nos. 18 and 20), a recent theoretical breakthrough in complex network modeling where edge types are introduced to represent heterogeneous relations (e.g., dependency, identity, etc.) among nodes across individual networks. Xnet 402 includes three main layers: Application Dependency (AppDep) 404 is a directed graph that represents the dependencies between applications that communicate over the data plane. Network Dependency (NetDep) 406 is a directed graph that represents the dependencies between network services that communicate over the control and data planes as they coordinate applications in AppDep. Finally, Network Topology (NetTopo) 408 is an undirected graph that represents the communication structure of the physical network as configured and maintained over the control plane. Note that the NetTopo 408 graph is fundamentally different from the other layers in that edges only represent the existence of a physical communications link. Dependencies that exist between nodes due to, for example, the broadcast nature of the shared medium are represented in the NetDep layer 406. A unique aspect of the Xnet 402 modeling lies in the edge types across network layers, where the dependent edges 410 between nodes in AppDep and those in NetDep are directed edges that represent a mapping of dependencies between applications and the network services on which they depend, and the dependent edges 412 between NetDep and NetTopo are directed edges that represent a mapping of dependencies between network services and the physical nodes on which they depend. Such unified interdependent modeling across control and data planes in the sound graph-theoretical framework of Xnet 402 not only enables us to passively observe information flows for the rapid detection of misinformation, but also actively probe over the nodes and their interdependencies to identify and isolate misbehaving nodes in a more robust and efficient manner. Importantly, this representation enables us to apply the powerful network science and information dynamics methods, using social networking techniques for reputation-based trust management. For further understanding, described below are the unique modeling techniques for exploiting dynamics, controllability, and evolvability in Xnet 402 for reliability estimation.

(4.3) Xnet Dynamics (XD) Module

An objective of XD modeling (via the XD module) is to detect and predict impending sudden behavior changes (critical transitions) in the AppDep and NetDep layers for misinformation identification. The XD module detects sudden behavior changes in activity time series by considering their global information transfer. Specifically, the XD module detects the behavior changes in modular interactions (e.g., peer-to-peer, fan-out, fan-in, etc.) among nodes by extending and applying an information dynamic spectrum framework to Xnet. A non-limiting example of a suitable information dynamic spectrum framework is that described in Literature Reference No. 4. An input to the XD module is the data plane behavior activity time series extracted from AppDep and NetDep layers of Xnet. The output includes indicators of structure dependency changes, including interdependencies between layers. If a sudden change is apparent in an indicator, the Reliability Estimation (RE) module will test the suspicious nodes. Since it considers global behavior interdependencies, the XD module is uniquely able to compute a comprehensive reliability estimate that cannot be achieved by observing solely at the local information in the control plane alone. For example, in Literature Reference No. 1, it was shown that applications that communicate using the Transmission Control Protocol (TCP) transport protocol in mobile ad-hoc networks (MANET)s can experience extended periods of extremely low throughput after a routing change has occurred, caused by the inability of TCP to distinguish packet losses caused by link breakages to packets losses caused by congestion. However, this kind of end-to-end effect is difficult to detect simply by observing traffic flow at the point where the link broke, because not only is traffic obfuscated by network-level encryption but also because there are many legitimate reasons why flow across a link may change (e.g. application behavior).

Given the behavior activity time series, the information dynamic techniques will compute for every pair of time series the associative transfer entropy to quantify the associative, asymmetric, and directional influences between two application processes. The associative transfer entropy at state $D_k$, for $i \neq j$ is defined as:

$$T_{x_j \to x_i}^{D_k} = \sum_{(x_{i,t+1}, x_{i,t}, x_{j,t}) \in D_k} p(x_{i,t+1}, x_{i,t}, x_{j,t}) \log \frac{p(x_{i,t+1} \mid x_{i,t}, x_{j,t})}{p(x_{i,t+1} \mid x_{i,t})}, \quad (1)$$

where $D_k$ is a subset of D that represents a certain associated state between $x_i$ and $x_j$, for example, the normal e-mail client-to-server information transfer would be different from the compromised ones, especially considering the global state of transition from a single compromised client to the population of compromised clients. Therefore, the system constructs the associative transfer entropy matrix (ATEM) from these pairwise measures to compute the spectral radius, the largest absolute eigenvalue of ATEM, to derive the amount of information transfer in the system as an indicator of impending sudden changes. The advantage of this approach is that it can detect behavior changes only observable from the global view of information transfer, rather than individual nodal statistics. With model-based trending techniques, the system can further predict the trajectories of the indicator to estimate the transition points.

Figure 5:
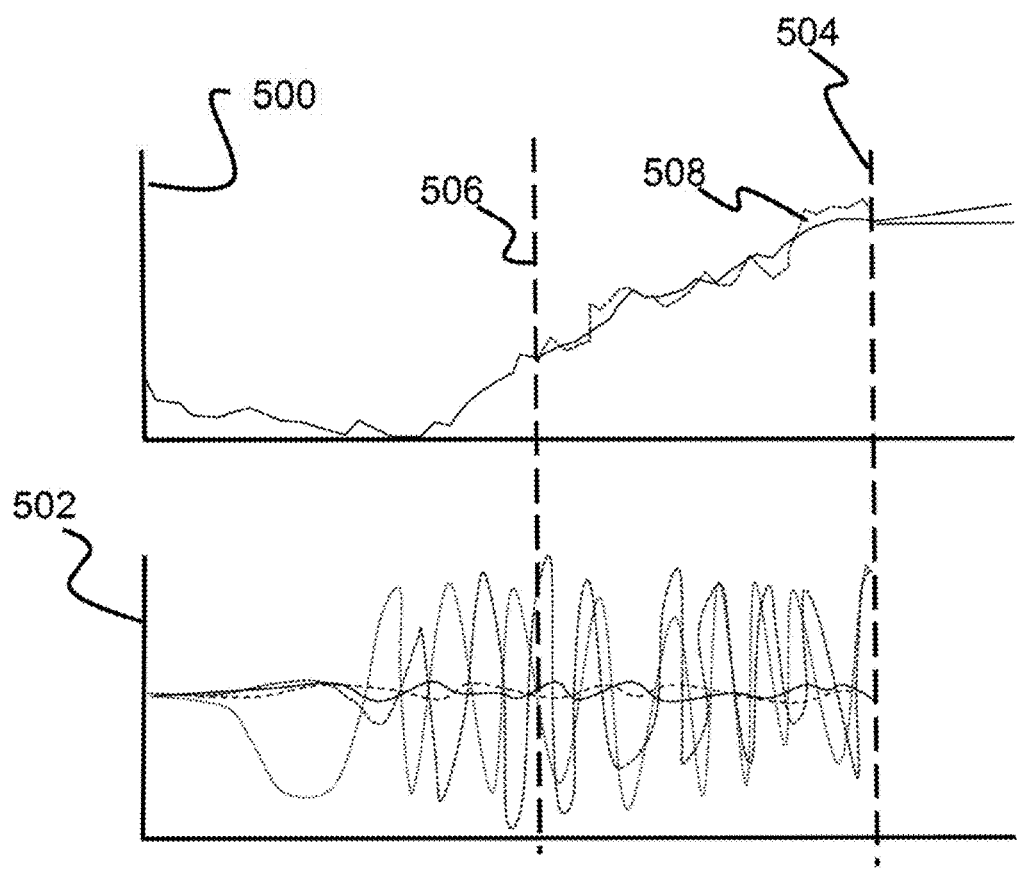
FIG. 5 includes two graphs of activity time series as used by an Xnet Dynamics Module to detect sudden behavior changes in activity time series by considering their global information transfer.

As a non-limiting example, FIG. 5 provides two graphs, a top graph 500 and a bottom graph 502. The x-axes represent time while the y-axes represent observed activity. The bottom graph 502 shows four observed activity time series. The top graph 500 shows the spectrum of ATEM and detects the changes (dashed line 506) far before its critical transition 504 (sudden behavior changes) are fully observed. The dashed line 508 in the top graph 500 is the predicted trajectory of behavior changes. Using these methods, it can be shown that the system is be able to focus the identification of misbehaving nodes down to a subgraph of less than ten percent of Xnet for more efficient attribution, and is able to identify greater than ninety percent of anomalous node behavior in cases where local routing behavior is too subtle to trigger detection.

(4.4) The Xnet Controllability and Observability (XCO) Module

An objective of Xnet controllability and observability (XCO) modeling (via the XCO module) is to identify nodes in the Xnet that are ideal for active probing and observation of suspect nodes for the purpose of attribution. The process of network controllability (as described in Literature Reference No. 2) can be used to identify driver nodes with time-dependent control of guiding network dynamics. Further, the dual theory process of network observability (as described in Literature Reference No. 3) is used to identify necessary and sufficient nodes to indirectly observe the hidden states of suspect nodes in Xnet. The input to the XCO module is the Xnet graph structure, as well as changes in interdependencies detected by Xnet dynamics modeling. The output of the XCO module is the set of driver nodes and the associated control centrality ranking with configuration paths, and the set of necessary and sufficient sensor nodes for misinformation attribution (as described below). Network controllability and observability of Xnet (network-of-networks) uniquely identifies a minimal set of influential probing and sensing points across the data and control planes based on the interdependencies and their changes.

To identify nodes for effective probing and sensing, Xnet is transformed (using any suitable technique) into a directed network that is suitable for the application of network controllability and observability theory. One possible transformation technique is to make undirected edges in Xnet into bi-directed edges, and consider cross-layer dependent edges and identity edges as time-delayed and instantaneous information flows, respectively. Another transformation technique is to group nodes with undirected (and identity) edges into cluster nodes such that the transformed graph structure only has directed edges over cluster nodes. Controllability theory is applied over the transformed structure to identify driver nodes and configuration paths. In particular, Xnet is considered as a complex system driven with nonlinear processes, approximated by the canonical linear, time-invariant dynamics, as follows:

$$dx(t)/dt = Ax(t) + Bu(t) \quad (2),$$

where the vector $x(t) = (x_1(t), \ldots, x_N(t))^T$ captures the state of a system of N nodes at time t. The N×N matrix A describes the system's wiring diagram and the interaction strength between its components (e.g., dependency of network services and nodes upon each other, provided as input by the network administrator at initialization). The N×M matrix B identifies the nodes controlled by an outside controller. The system is controlled using the time-dependent input vector $u(t) = (u_1(t), \ldots, u_M(t))^T$ imposed by the controller, where in general the same signal $u_j(t)$ can drive multiple nodes. The purpose of network controllability is to identify the set of driver nodes (driven by the input vector) that can fully control the system. Any system is fully controlled if one controls each node individually, i.e. M=N, which is costly and typically impractical. Typically, one is therefore interested in identifying the minimum number of driver nodes, denoted by $N_D$, whose control is sufficient to fully control the system's dynamics. By mapping the problem into the graph-theoretical form, a bi-partite graph matching algorithm can be applied with time complexity $O(N^{1/2}E)$, where E denotes the number of edges in the transformed Xnet, to efficiently identify the driver nodes. Control centrality is then computed for each node in identified maximum matching (FIG. 4), and rank it to select the probing points for misinformation attribution. For example, one may consider behavior changes of modular interactions identified by Xnet dynamics as the targets and select from the ranking of nodes that best drive the dynamics of the targets.

Figure 6:
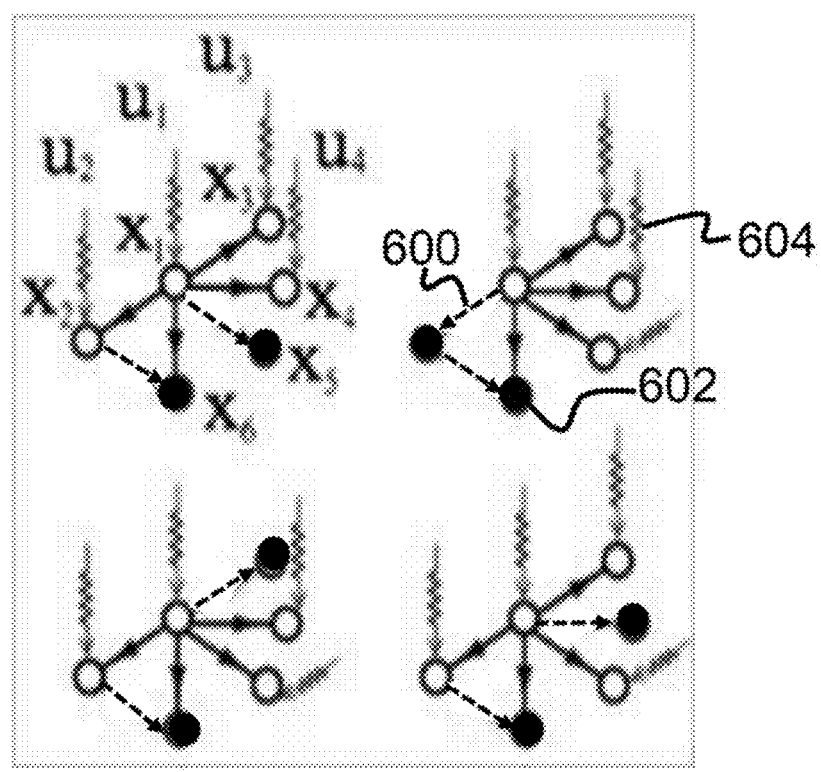
FIG. 6 is an illustration depicting four maximum matchings.

FIG. 6, for example, illustrates the XCO module a identifying optimal driver and sensing nodes to enable effective active probing for reliability estimation. The illustration depicts four different groups of nodes, with maximum matching (dashed arrows 600) with matched nodes (solid nodes 602), which therefore results in four different sets of driver nodes (curly links 604) for each group.

To identify the optimal sensing points for given targets, it is necessary to first identify strongly connected components (SCC) to decompose Xnet into a unique set of maximal SCCs, which are the largest subgraphs chosen such that there is a directed path from each node to every other node in the subgraph. SCC with no incoming edges are called root SCCs, and it requires choosing at least one node in each root SCC to observe the internal states of the system. Since target nodes will reside in one of the SCCs that may or may not be a root, target observability is invoked, where the state of a target node $x_t$ can be observed by a sensor node $x_s$, if only there is a directed path from $x_s$ to $x_t$. Therefore, the optimal set of sensor nodes for target node $x_t$ would be the minimum number of sensor nodes in SCCs that can reach $x_t$. Together with the identified driver nodes, misinformation attribution can further refine and update reliability estimates based on the information revealed by active probing. Xnet controllability and observability (the XCO module) will be able to identify less than ten percent of nodes in the suspect subgraph with strong influence, reducing the overhead of active probing.

(4.5) Xnet Evolvability (XE) Module

An objective of objective of XE modeling (via the XE module) is to anticipate the potential propagation and consequences of an attack, in order to focus resources for monitoring and protecting the network. The XE module will keep track of the pattern of node failure to see whether it can be explained by a viral attack. A unique aspect lies in modeling the interaction of cascading and contagion dynamics in Xnet with percolation theory to anticipate attack effect evolution, which goes beyond considering only the cascading failure dynamics in interdependent networks as illustrated in Literature Reference No. 18. The input of the XE module is the Xnet structure and the observed (or attributed) misbehaving nodes, either passively identified by Xnet dynamics, or actively identified by Xnet controllability and observability modeling. The output of the XE module is a confidence measure of how well the observed pattern of node failures matches a contagion or cascade failure; if confidence is high, then it outputs the simulation results of anticipated (predicted) contagion paths with a set of anticipated (predicted) critical nodes whose failures can trigger the collapse of Xnet structure (i.e. paralyzing the wireless network). By considering the interaction between contagion and cascading, the XE module provides the unique capability to anticipate how node failures may spread. It quantifies the probability of serious network disruption, such as partitioning or communication collapse, and the effect of attacks, such as the survival mean network size after the attack. Such simulation results can improve reliability estimation by focusing resources on nodes most likely to become targets, but can also provide invaluable information for the purpose of stopping the spread and cascading effects of attacks.

Given the Xnet structure and the attributed misinformation source and paths, contagion dynamics are considered, such as the SIR (Susceptible-Infected-Recovered) and SIS models, to anticipate the spread of communicable states on networks (e.g. viruses/malware infection of computer networks). Failure cascade dynamics are also considered, such as load-driven or dependency-driven cascade models, to anticipate the collapse of network structure caused by the nonlinear reliance of network service on critically placed nodes. Contagion parameters are first identified (such as degree distribution, transmission and recovery rates, and the speed of spread) to match the spread of the observed (attributed) misinformation so far. Thereafter, the spreads are simulated with significant lead time to provide enough time windows for the field confirmation of the actual-to-anticipated spreads. In parallel, it is desirable to simulate load-driven and dependency-driven failure cascade after nodes are infected, with a certain ramp-down time window to anticipate the collapse induced by the interaction of cascade and contagion dynamics. The complexity of each simulation run is in the order of O(NM) with a graph size of N and M edges. For illustrative purpose, a pilot run simulation of contagions and cascades over the networks of size 10-100 is shown in FIGS. 7A and 7B.

Specifically, FIG. 7A provides the simulation results, showing the probability 700 that a large connected component remains in the network, and its corresponding size 702. Maintaining connected components in the network is essential for communications and distributed services. FIG. 7B illustrations the simulations of contagion and provided the likelihood of an epidemic forming and the likelihood the infection (i.e., corruption) of individual nodes that leads to epidemics. It is expected that the XE module provides greater than seventy percent prediction accuracy of a node infection with less than five percent being false positives. Further, the system achieves greater than ninety percent prediction of a cascading failure event with less than five percent being false positives.

(4.6) Reliability Estimation (RE) Module

Objectives of the Reliability and Estimation (RE) module are to: (1) compute and maintain estimates of trust (local) and reputation (global) for physical nodes based on a unified metric of reliability estimation, (2) detect potential sources of misinformation based on changes in reputation, and (3) establish accurate attribution using passive and active-probing techniques. The approach in that it utilizes a unified metric which fuses information from across network layers, and across control and data planes, within a formal mathematical model for trust that incorporates notions of belief, disbelief, and uncertainty and can be reasoned over using a formal algebraic framework. The RE module also employs an algorithmic method efficiently and accurately conducts active probing of suspect (target) nodes for attribution, making calls to the Xnet Controllability/Observability (XCO) and the Xnet Evolvability (XE) modules. The input to the RE module is the annotated Xnet structure. The outputs are the set of physical nodes that have been identified as sources of misinformation.

Figure 8:
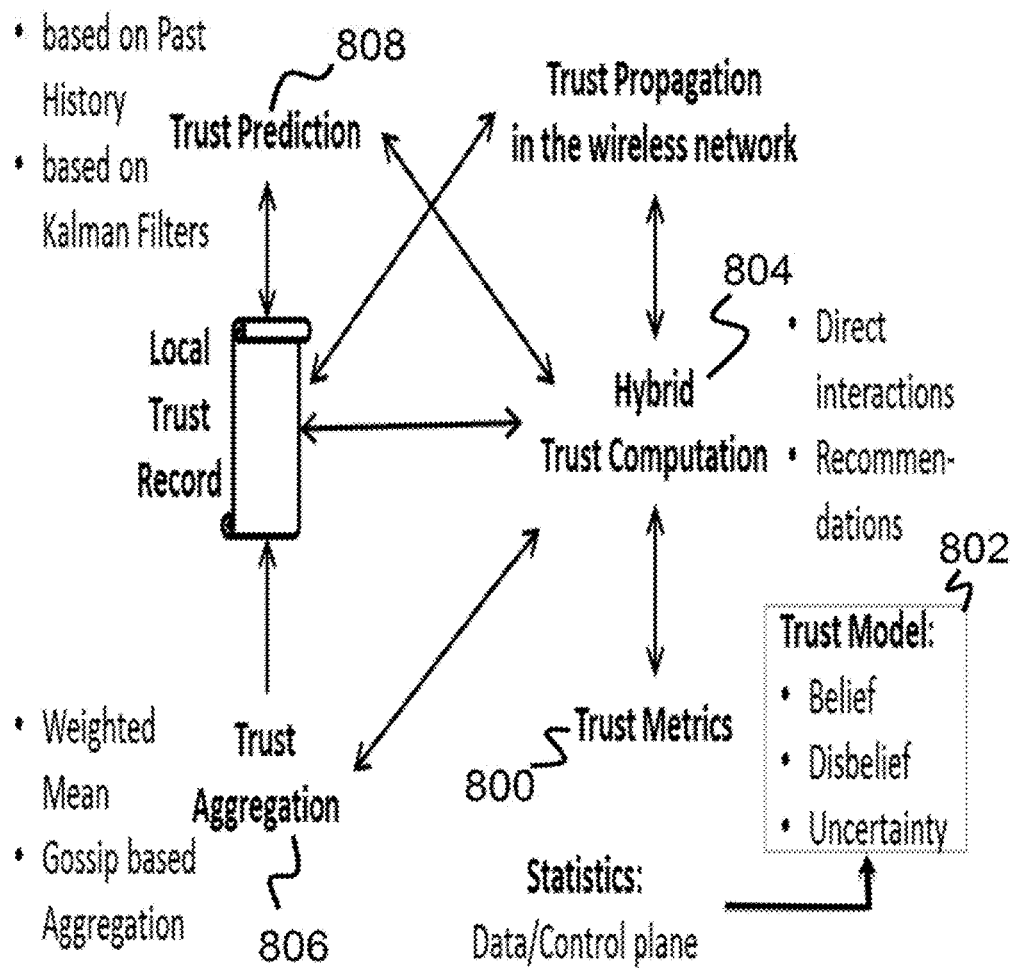
FIG. 8 is an illustration depicting an architecture of a Reliability Estimation module.

For further understanding, FIG. 8 provides an illustration depicting architecture of the RE module, which includes trust metrics 800. Trust metrics 800 is a mathematical model for expressing uncertain beliefs about the degree of trust in other nodes' operations. The model is based on the trust algebra framework proposed as proposed in Literature Reference No. 25. In essence, reliability is a principled combination of local experience and references from other nodes.

Trust 802 is represented with degrees of belief, or disbelief in correctness of the operation of a node as well as uncertainty which fills the void in the absence of both belief and disbelief. This can be formalized as b+d+u=1 (b, d, u)$\in[0,1]^2$ where b, d, and u designate belief, disbelief and uncertainty. The instance of a trust estimate for a node is called a trust opinion. An algebra of trust can be defined to capture required operations, such as: conjunction (combining two trust opinions on two nodes into a joint single trust opinion on both nodes), recommendation (establishing a trust opinion about a node based on another node's recommendation about that node), and consensus (combining trust opinions of different nodes about another node).

Hybrid Trust Computation 804 is when a node, A, interacts directly with a neighbor, B, it computes a value for the trust metric for B, denoted as $t_B^A = [b_B^A, d_B^A, u_B^A]$. $b_B^A$ can be computed from successful control protocol interactions (e.g., valid routing updates) or successful data interactions (e.g., forwarding). $d_B^A$ can be computed from the number of unsuccessful control protocol interactions (e.g. invalid routing updates) or unsuccessful data interactions (e.g. dropping).

Trust Aggregation 806 is when different values of trust for a particular target node are aggregated to form the reputation metric for the node. The consensus operator is used to resolve situations where trust values are distributed along multiple (different) paths resulting in the arrival of multiple versions of the trust.

Trust Prediction 808 is the prediction of the potentially unknown trust between nodes using the present and past behavior of nodes and the recommendations received from other nodes is performed using the analysis by the XE module.

Disambiguating suspected from actual sources of misinformation may require active interrogation or "probing" to determine if the behaviors that caused the nodes to be suspected are due to consequences of normal operation (e.g., dropping of packets due to a broken link) or malicious operation. Protocols will use the XCO module to process Xnet annotated with the set of suspect nodes to identify the ideal set of driver and sensor nodes from which to control and observe changes in the target nodes. For example, driver nodes may collaborate to force packets through suspect nodes to detect if the node's forwarding service is following proper protocol.

(4.7) Architecture

Figure 9:
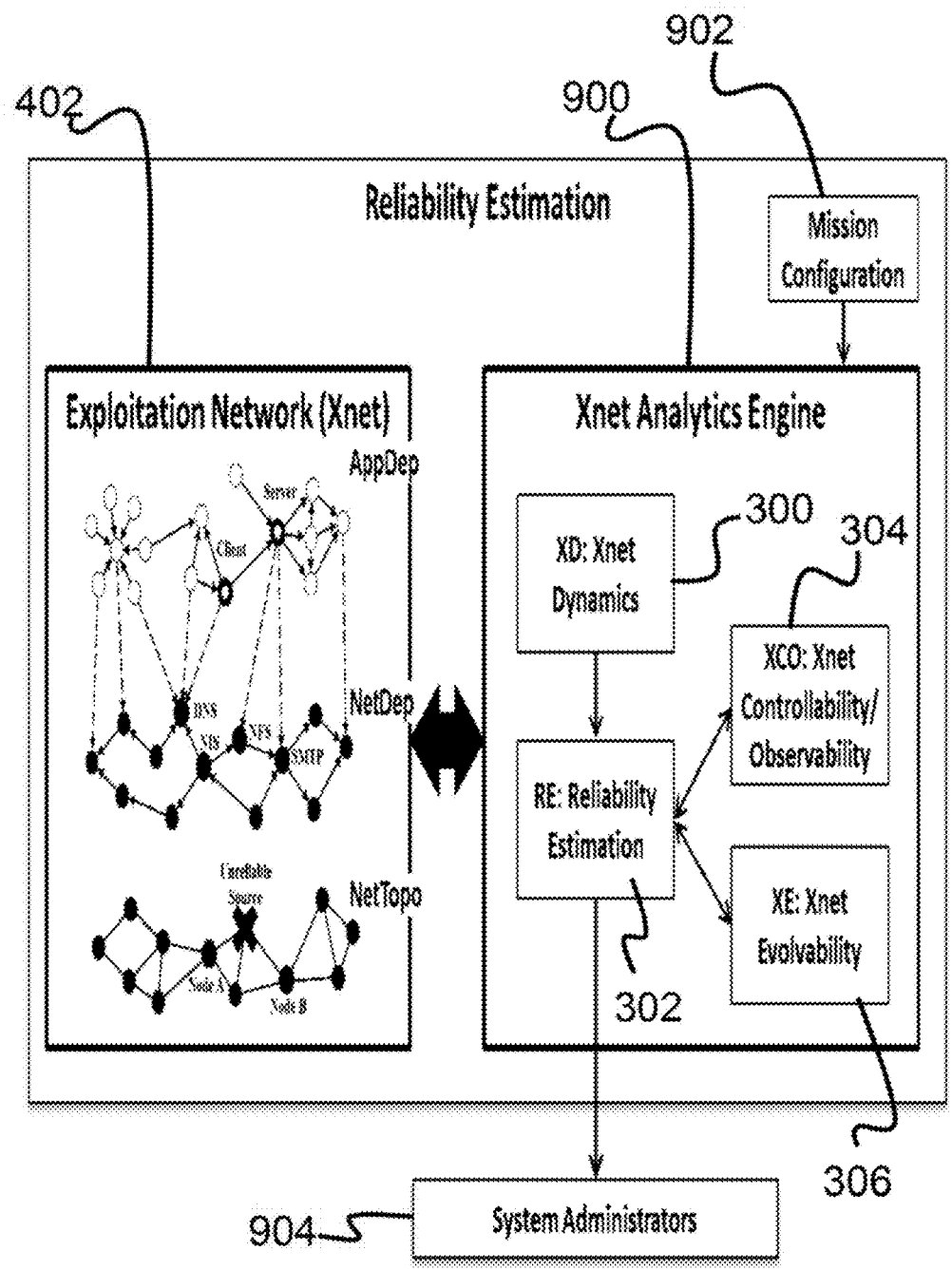
FIG. 9 is illustration depicting architecture of the system according to the principles of the present invention.

For further understanding, the architecture of the system described herein is illustrated in FIG. 9. The system includes two main elements, the Exploitation Network (Xnet) 402 and the Xnet Analytics Engine (XAE) 900. The Xnet 402 is a distributed database that is maintained on every node in the network. The majority of the input and output information from the XAE 900 and its modules is stored as annotations on Xnet 402. The XAE 900 takes as input the mission configuration 902 information from the network administrator, including a baseline of Xnet 402, and outputs to a network administrator 904 the identity of the nodes that it has detected are sources of misinformation, as well additional information that may be of benefit. For example, the system outputs information such as the anticipated contagion paths and critical nodes whose failures can trigger the collapse of Xnet 402 and the mobile wireless network. Within XAE 900, the Xnet Dynamics (XD) module 300 monitors Xnet 402 for sudden changes in dynamics. The Reliability Estimation (RE) module 302 maintains and monitors the trust and reputation of the nodes in the network topology. If either the XD module 300 or RE module 302 detect the possible presence of a source of misinformation, then the RE module 302 invokes the Xnet Controllability and Observability (XCO) module 304 to compute the set of driver and observation nodes for interrogating (probing) the suspect (target) nodes for attribution. If attribution is successful, the RE module 302 outputs the set of affirmed nodes. The Xnet Evolvability (XE) module 306 runs simulations in parallel with the other modules to observe the interaction of cascading and contagion dynamics on Xnet 402 as it evolves, as triggered by a call from the RE module 302. Thus, as can be appreciated by those skilled in the art, described is an efficient system that uses graph-theoretic and information dynamics analysis to identify misbehaving nodes. The system further estimates the reliability of nodes not only now, but predicts their reliability into the future so that remedies can get ahead of an attack.

What is claimed is:

1. A system for determining reliability of nodes in a mobile wireless network, the system comprising:
    one or more processors and a memory, the memory being a non-transitory computer-readable medium having executable instructions encoded thereon, such that upon execution of the instructions, the one or more processors perform operations of:
    receiving an Exploitation Network (Xnet) database, the Xnet database having an Xnet structure formed of a physical node layer (NetTopo), a network dependent (NetDep) layer, and an application dependent (AppDep) layer, the NetTopo layer having NetTopo graphs reflecting connectivity between the nodes, the NetDep layer having NetDep graphs reflecting connectivity dependencies amongst the nodes, and the AppDep layer having Appdep graphs reflecting software application dependencies amongst the nodes;
    running an Xnet Analytics Engine that monitors and evaluates reliability of each node in the mobile wireless network to provide a reliability estimate of each node and designating suspect nodes;
    actively probing suspect nodes to determine if behaviors that caused the suspect nodes to be suspected are due to consequences of normal operation or malicious operation; and
    isolating nodes in the mobile wireless network that are determined to be exhibiting behaviors due to malicious operation.

2. The system as set forth in claim 1, wherein the Xnet Analytics Engine further comprises:
    an Xnet Dynamics (XD) module that is operable for detecting and predicting critical transitions in the AppDep and NetDep layers for misinformation identification;
    an Xnet Controllability and Observability (XCO) module that is operable for identifying nodes in the Xnet for active probing and observation as suspect nodes;
    an Xnet Evolvability (XE) module that is operable for predicting potential propagation and consequences of an attack on one or more nodes and focusing resources for monitoring and protecting the network; and
    a Reliability Estimation (RE) module that is operable for receiving data from each of the XD module, XCO module, and XE module to generate a reliability estimation of each node in the mobile wireless network, the reliability estimation being a trust metric.

3. The system as set forth in claim 2, wherein if a node's trust metric falls below a threshold, causing the XCO module to actively probe and observe the node to test the reliability estimate.

4. The system as set forth in claim 3, wherein the XD module receives a data plane of behavior time series as extracted from the AppDep and NetDep layers to generate structure dependency changes in the AppDep and NetDep layers, the structure dependency changes being indicative of critical transitions in the AppDep and NetDep layers between misbehaving nodes for misinformation identification.

5. The system as set forth in claim 4, wherein the XCO module receives the AppDep graphs, NetDep graphs, NetTopo graphs, and structure dependency changes as generated by the XD module to identify the nodes in the Xnet for active probing and observation as suspect nodes.

6. The system as set forth in claim 5, wherein the XE module receives the Xnet structure, the misbehaving nodes, and suspect nodes to generate a confidence measure of how well an observed pattern of node failures matches a contagion or cascade failure, such that if the confidence measure exceeds a threshold, the XE module outputs simulation results of anticipated contagion paths with a set of anticipated critical nodes whose failures can trigger collapse of the Xnet structure.

7. A method for determining reliability of nodes in a mobile wireless network, the method comprising an act of:
    causing one or more processors to execute instructions on a memory, such that upon execution of the instructions, the one or more processors perform operations of:
    receiving an Exploitation Network (Xnet) database, the Xnet database having an Xnet structure formed of a physical node layer (NetTopo), a network dependent (NetDep) layer, and an application dependent (AppDep) layer, the NetTopo layer having NetTopo graphs reflecting connectivity between the nodes, the NetDep layer having NetDep graphs reflecting connectivity dependencies amongst the nodes, and the AppDep layer having Appdep graphs reflecting software application dependencies amongst the nodes; and running an Xnet Analytics Engine that monitors and evaluates reliability of each node in the mobile wireless network to provide a reliability estimate of each node and designating suspect nodes;

actively probing suspect nodes to determine if behaviors that caused the suspect nodes to be suspected are due to consequences of normal operation or malicious operation; and isolating nodes in the mobile wireless network that are determined to be exhibiting behaviors due to malicious operation.

8. The method as set forth in claim 7, wherein running the Xnet Analytics Engine further comprises operations of:

detecting and predicting, with an Xnet Dynamics (XD) module, critical transitions in the AppDep and NetDep layers for misinformation identification;

identifying, with an Xnet Controllability and Observability (XCO) module, nodes in the Xnet for active probing and observation as suspect nodes;

predicting, with an Xnet Evolvability (XE) module, potential propagation and consequences of an attack on one or more nodes and focusing resources for monitoring and protecting the network; and receiving, with a Reliability Estimation (RE) module, data from each of the XD module, XCO module, and XE module to generate a reliability estimation of each node in the mobile wireless network, the reliability estimation being a trust metric.

9. The method as set forth in claim 8, wherein if a node's trust metric falls below a threshold, causing the XCO module to actively probe and observe the node to test the reliability estimate.

10. The method as set forth in claim 9, wherein the XD module receives a data plane of behavior time series as extracted from the AppDep and NetDep layers to generate structure dependency changes in the AppDep and NetDep layers, the structure dependency changes being indicative of critical transitions in the AppDep and NetDep layers between misbehaving nodes for misinformation identification.

11. The method as set forth in claim 10, wherein the XCO module receives the AppDep graphs, NetDep graphs, NetTopo graphs, and structure dependency changes as generated by the XD module to identify the nodes in the Xnet for active probing and observation as suspect nodes.

12. The method as set forth in claim 11, wherein the XE module receives the Xnet structure, the misbehaving nodes, and suspect nodes to generate a confidence measure of how well an observed pattern of node failures matches a contagion or cascade failure, such that if the confidence measure exceeds a threshold, the XE module outputs simulation results of anticipated contagion paths with a set of anticipated critical nodes whose failures can trigger collapse of the Xnet structure.

13. A computer program product for determining reliability of nodes in a mobile wireless network, the computer program product comprising:

a non-transitory computer-readable medium having executable instructions encoded thereon, such that upon execution of the instructions by one or more processors, the one or more processors perform operations of:

receiving an Exploitation Network (Xnet) database, the Xnet database having an Xnet structure formed of a physical node layer (NetTopo), a network dependent (NetDep) layer, and an application dependent (AppDep) layer, the NetTopo layer having NetTopo graphs reflecting connectivity between the nodes, the NetDep layer having NetDep graphs reflecting connectivity dependencies amongst the nodes, and the AppDep layer having Appdep graphs reflecting software application dependencies amongst the nodes; and running an Xnet Analytics Engine that monitors and evaluates reliability of each node in the mobile wireless network to provide a reliability estimate of each node and designating suspect nodes;

actively probing suspect nodes to determine if behaviors that caused the suspect nodes to be suspected are due to consequences of normal operation or malicious operation; and isolating nodes in the mobile wireless network that are determined to be exhibiting behaviors due to malicious operation.

14. The computer program product as set forth in claim 13, wherein running the Xnet Analytics Engine further comprises operations of:

detecting and predicting, with an Xnet Dynamics (XD) module, critical transitions in the AppDep and NetDep layers for misinformation identification;

identifying, with an Xnet Controllability and Observability (XCO) module, nodes in the Xnet for active probing and observation as suspect nodes;

predicting, with an Xnet Evolvability (XE) module, potential propagation and consequences of an attack on one or more nodes and focusing resources for monitoring and protecting the network; and receiving, with a Reliability Estimation (RE) module, data from each of the XD module, XCO module, and XE module to generate a reliability estimation of each node in the mobile wireless network, the reliability estimation being a trust metric.

15. The computer program product as set forth in claim 14, wherein if a node's trust metric falls below a threshold, causing the XCO module to actively probe and observe the node to test the reliability estimate.

16. The computer program product as set forth in claim 15, wherein the XD module receives a data plane of behavior time series as extracted from the AppDep and NetDep layers to generate structure dependency changes in the AppDep and NetDep layers, the structure dependency changes being indicative of critical transitions in the AppDep and NetDep layers between misbehaving nodes for misinformation identification.

17. The computer program product as set forth in claim 16, wherein the XCO module receives the AppDep graphs, NetDep graphs, NetTopo graphs, and structure dependency changes as generated by the XD module to identify the nodes in the Xnet for active probing and observation as suspect nodes.

18. The computer program product as set forth in claim 17, wherein the XE module receives the Xnet structure, the misbehaving nodes, and suspect nodes to generate a confidence measure of how well an observed pattern of node failures matches a contagion or cascade failure, such that if the confidence measure exceeds a threshold, the XE module outputs simulation results of anticipated contagion paths with a set of anticipated critical nodes whose failures can trigger collapse of the Xnet structure.

19. The system as set forth in claim 1, wherein actively probing suspect nodes includes forcing packets through one or more suspect nodes to detect if the one or more suspect node's forwarding service is following protocol.

20. The method as set forth in claim 7, wherein actively probing suspect nodes includes forcing packets through one or more suspect nodes to detect if the one or more suspect node's forwarding service is following protocol.

21. The computer program product as set forth in claim 13, wherein actively probing suspect nodes includes forcing packets through one or more suspect nodes to detect if the one or more suspect node's forwarding service is following protocol.

\* \* \* \* \*